(12) United States Patent
Reig et al.

(10) Patent No.: US 6,851,560 B2
(45) Date of Patent: Feb. 8, 2005

(54) DRAIN ELEMENT COMPRISING A LINER CONSISTING OF HOLLOW RODS FOR COLLECTING IN PARTICULAR HYDROCARBONS

(75) Inventors: Raphaël Reig, Poitiers (FR); David Bruxelle, Chauvigny (FR); Philippe Lavernhe, Poitiers (FR)

(73) Assignee: Johnson Filtration Systems, Availles en Chatellerault (FR)

(*) Notice: Subject to any disclaimer, the term of this patent is extended or adjusted under 35 U.S.C. 154(b) by 123 days.

(21) Appl. No.: 10/380,519
(22) PCT Filed: Sep. 26, 2001
(86) PCT No.: PCT/FR01/02976
§ 371 (c)(1), (2), (4) Date: Mar. 14, 2003
(87) PCT Pub. No.: WO02/31314
PCT Pub. Date: Apr. 18, 2002

(65) Prior Publication Data
US 2004/0031607 A1 Feb. 19, 2004

(30) Foreign Application Priority Data
Oct. 9, 2000 (FR) .......................... 00 12885

(51) Int. Cl.⁷ .................. E21B 43/32; B01D 35/48
(52) U.S. Cl. ............... 210/418; 210/458; 210/459; 210/490; 210/497.1; 166/233; 166/316
(58) Field of Search ................ 210/418, 457, 210/458, 459, 488, 489, 490, 497; 166/231–233, 316, 373

(56) References Cited

U.S. PATENT DOCUMENTS

| 4,088,580 A | | 5/1978 | Spurlock |
| 5,435,393 A | * | 7/1995 | Brekke et al. ............... 166/370 |
| 5,803,179 A | | 9/1998 | Echols et al. |
| 5,868,200 A | | 2/1999 | Bryant et al. |

FOREIGN PATENT DOCUMENTS

| GB | 2325949 A | 12/1998 |
| WO | WO 0045031 | 8/2000 |

* cited by examiner

Primary Examiner—Matthew O. Savage
(74) Attorney, Agent, or Firm—Sughrue Mion, PLLC

(57) ABSTRACT

The drain element for collecting hydrocarbons comprises a screen (TM) surrounding a suction cylinder (CA) extending in a longitudinal direction (AL). The screen is made up of rods (TT, TC) which extend along said longitudinal direction (AL) and which are regularly spaced apart around the suction cylinder. At least one of said rods is hollow in order to form a collector rod (TC), said collector rod (TC) having a lateral orifice and communicating with the inside of the suction cylinder via one of its ends.

7 Claims, 3 Drawing Sheets

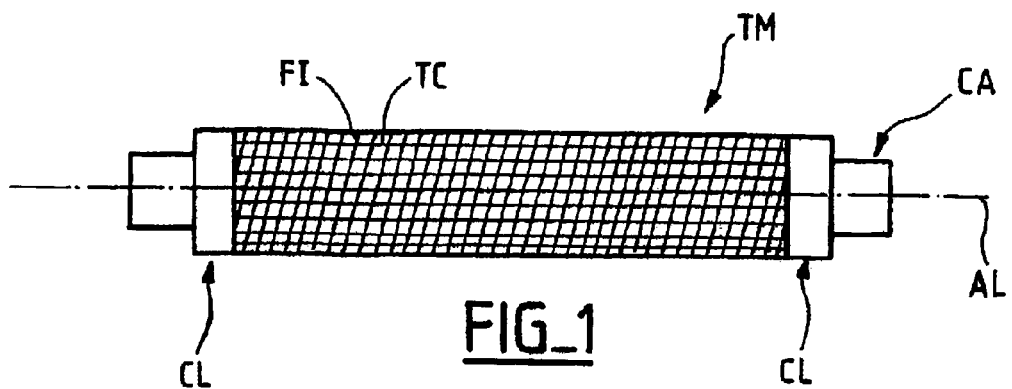
FIG_1
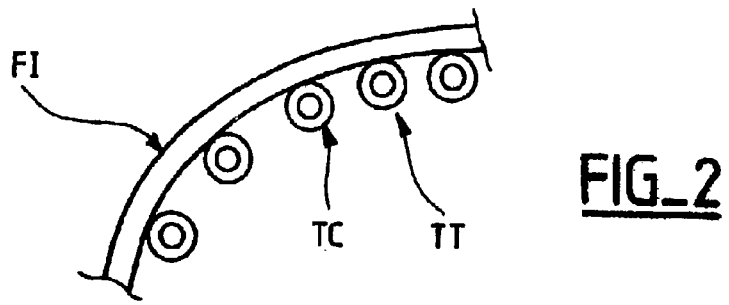
FIG_2
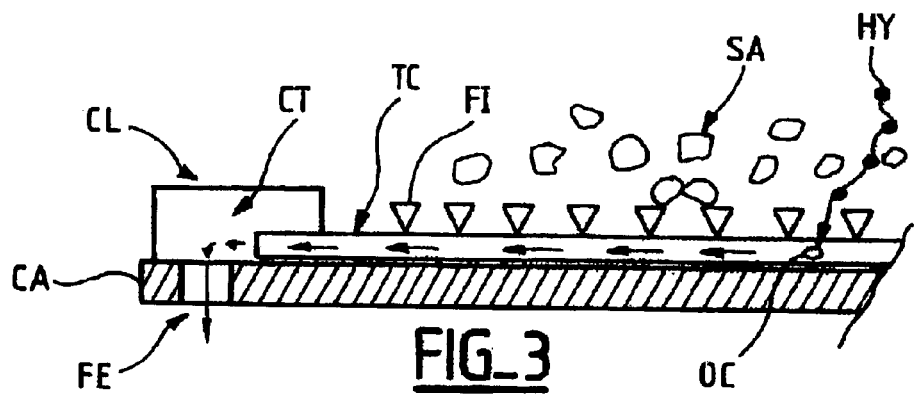
FIG_3
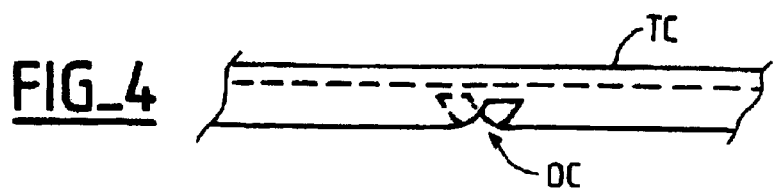
FIG_4

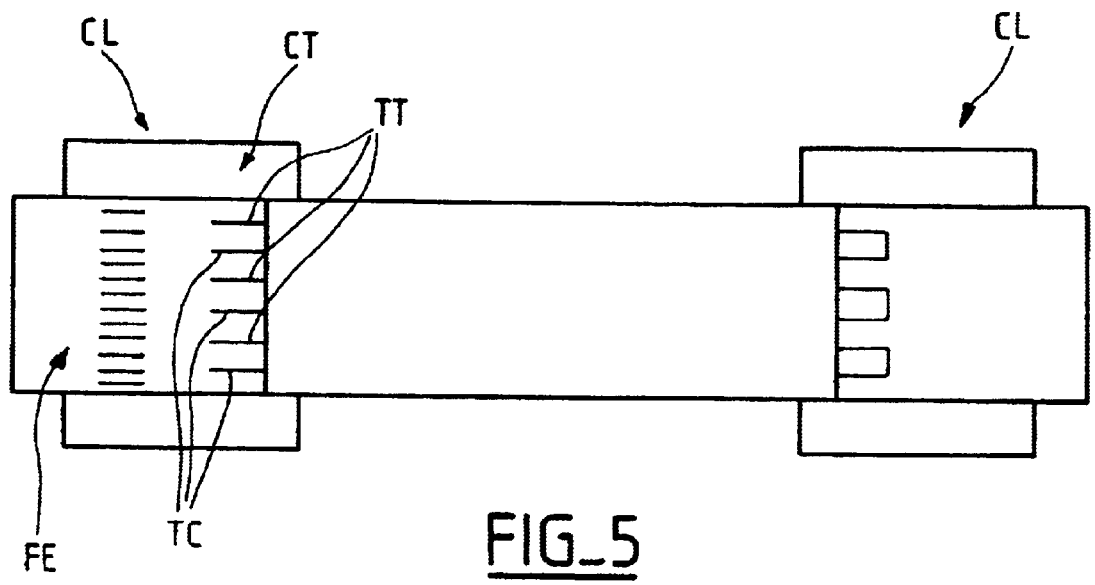
FIG_5
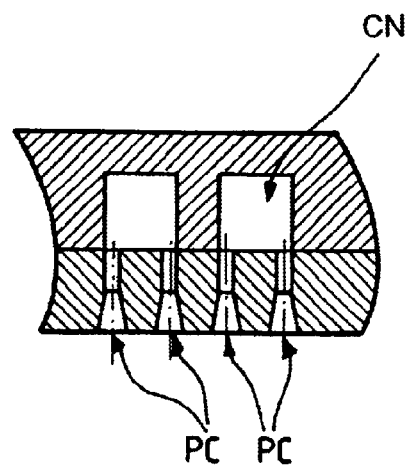
FIG_8

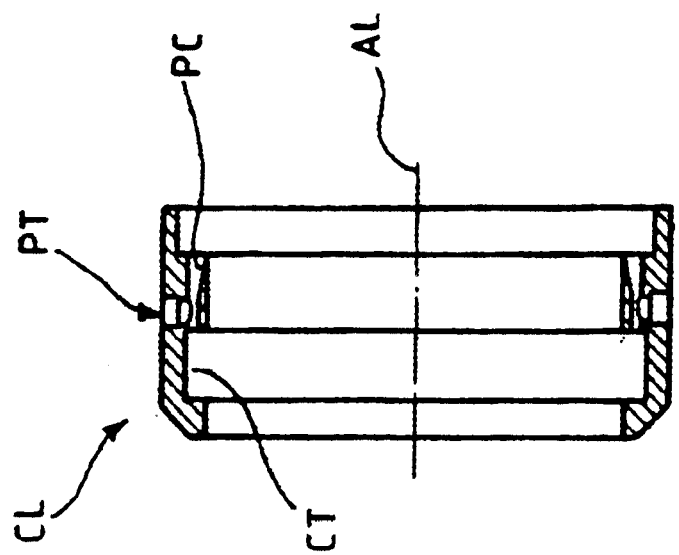
FIG_7
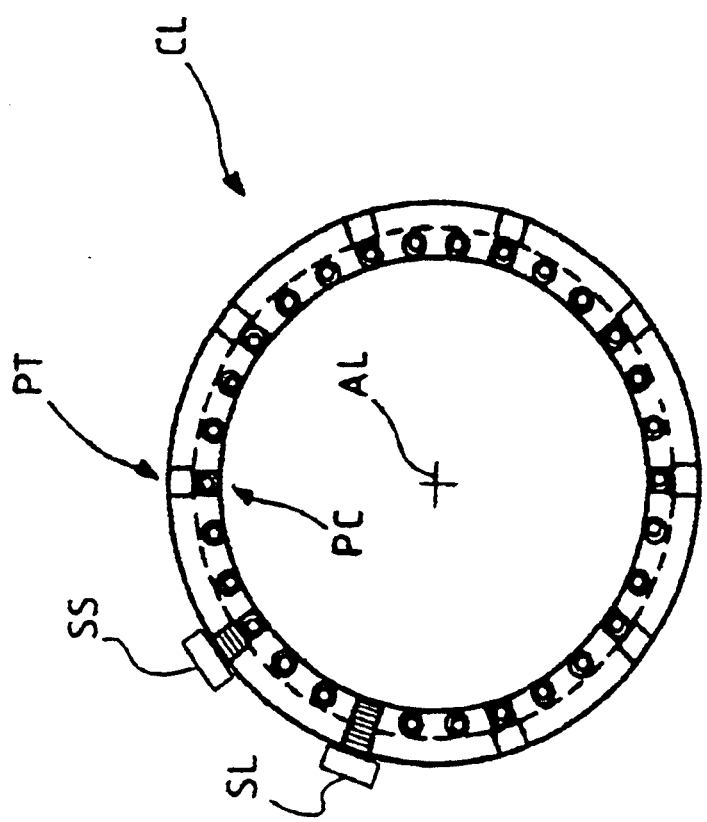
FIG_6

DRAIN ELEMENT COMPRISING A LINER CONSISTING OF HOLLOW RODS FOR COLLECTING IN PARTICULAR HYDROCARBONS

The invention relates to a drain element for collecting hydrocarbons in particular, and comprising a screen surrounding a suction cylinder extending in a longitudinal direction.

The invention applies, for example, to working hydrocarbons in the context of production with a borehole that is horizontal or highly inclined. In such a context, a plurality of drain elements are mounted end to end to form a drain passing through a hydrocarbon reservoir, and suction is established in an extraction installation mounted on the surface, e.g. for the purpose of raising crude oil from the reservoir which is situated at depth. In such an installation, the length of the drain is commonly of the order of 1000 meters (m) and the length of a drain element is generally about 10 meters. Each drain element filters and collects hydrocarbon which migrates from the reservoir towards the suction cylinder, and all of the suction cylinders are connected end to end so that all of the hydrocarbon collected over the entire length of the drain is conveyed towards the surface.

Once a flow becomes established, large head losses appear between the heel end of the drain (its portion closest to the surface) and the underground toe end of the drain, such that the rate at which a drain element produces hydrocarbon is significantly higher close to the heel of the drain than close to its toe end. As a result, the hydrocarbon reservoir empties in the vicinity of the heel, and gas or water are then sucked in through the heel, which disturbs production and causes production from the reservoir to be stopped even though it still contains a large quantity of hydrocarbon in a zone situated around the toe end of the drain. This phenomenon is known as "coning".

To solve this problem, patent documents GB-2 325 949 and U.S. Pat. No. 5,435,393 disclose drain elements that impart head loss that can be modulated. Thus, elements having low head loss are placed towards the toe end of the drain in order to increase flow rate in said zone while drain elements having large head loss are placed in the heel of the drain in order to reduce flow rate in said zone. In a drain made in that way, the flow rate in the various elements is uniform so that the hydrocarbon reservoir empties uniformly over the entire length of the drain. In document U.S. Pat. No. 5,435,393, the hydrocarbon is collected by a ring positioned between the suction cylinder and the screen surrounding the cylinder. This ring collects hydrocarbon and has a baffle through which the hydrocarbon must pass in order to migrate into the inside of the suction cylinder. It is possible to modify the length of the baffle by shutting off certain channels of the ring with screws so as to modify the head loss imparted. The ring of such a drain element is a complex part and manufacture thereof is very expensive, and furthermore, hydrocarbon is collected only in the vicinity of the ring, thereby limiting production.

The object of the invention is to remedy those drawbacks by proposing a drain element of simpler design.

To this end, the invention provides a drain element for collecting hydrocarbons in particular and as defined by claim 1. Such a structure ensures that the hydrocarbon is collected by the screen itself, thereby simplifying construction, and the head loss introduced by the drain element can be modified by acting on the number of collection rods communicating with the inside of the cylinder.

The drain element of the invention may include an annular manifold mounted around the cylinder and co-operating with the cylinder to define a toroidal cavity which communicates with the inside of the cylinder via slots provided in the cylinder for this purpose. The manifold is provided with holes extending in the longitudinal direction and opening out into said toroidal cavity, the holes being designed for receiving hollow rods of the screen in order to put them into communication with the inside of the suction cylinder via said toroidal cavity. With this arrangement, the manifold which provides communication between the collection rods and the inside of the cylinder can be mounted as an interference fit on the cylinder. The manifold may have radial holes extending radially relative to the longitudinal axis, each radial hole communicating with a corresponding longitudinal hole, each radial hole being arranged to receive a screw for interrupting or releasing communication between the corresponding longitudinal drill hole and the toroidal cavity. With this arrangement, the number of collection rods communicating with the inside of the suction cylinder of a drain element can be adjusted on site, prior to inserting the drain element into the borehole. The use of stud screws or of simple screws can make the adjustment operation easier. In a particular arrangement of the drain element of the invention, at least one rod of the screen is a hollow rod without any side orifice in order to form a transport rod, and at least one collection rod communicates with the inside of the cylinder via a transport rod or via a plurality of transport rods connected in series, connecting the inside of the cylinder to one end of said collection rod. With this arrangement, the head loss in each collection rod can be further increased by connecting the ends of some of the hollow rods of the screen to one another. The drain element may have a first annular manifold at one of its ends for connecting with rods inside the cylinder, and a second annular manifold at its other end, said second manifold being provided with longitudinal holes for receiving hollow rods and with channels connecting certain successive longitudinal holes so as to connect two successive rods in series. With this arrangement, two rods can be connected in series at the second manifold.

The invention is described below in greater detail with reference to the accompanying drawings which show an embodiment by way of non-limiting example.

FIG. 1 is a diagrammatic view of a drain element.

FIG. 2 is a fragmentary section view of the screen of the drain element of the invention.

FIG. 3 is a fragmentary section view of the drain element of the invention.

FIG. 4 is a diagram of a collector rod of the invention.

FIG. 5 is an overall diagram of a drain element of the invention.

FIGS. 6 and 7 are section views of an example of an annular manifold of the drain element of the invention.

FIG. 8 is a fragmentary view of a second manifold of the drain element of the invention.

The drain element of the invention comprises a suction cylinder CA which extends longitudinally along an axis AL, as can be seen in FIG. 1. This suction cylinder is surrounded by a screen TM, e.g. a metal screen constituting a strainer, the screen itself being constituted by longitudinally-extending rods arranged around the cylinder CA. The rods are secured to a wire FI surrounding them so as to form the screen TM. The wire FI is welded to said rods, e.g. using an electrical resistance welding method and it surrounds the rods so as to describe a helix around the longitudinal axis AL. The screen TM is thus in the form of a cylinder surrounding the suction cylinder CA and it is held on the suction cylinder CA by means of two annular manifolds CL also mounted around the cylinder CA, each manifold being secured to one end of the cylindrical screen TM. These manifolds may be interference fits on the cylinder CA, for example.

As can be seen in FIG. 2, the rods TT and TC of the drain element of the invention are hollow tubular rods such that hydrocarbon is collected and conveyed towards the inside of the suction cylinder CA via these rods that form the screen TM.

More particularly, some of the rods are hollow rods having lateral orifices OC so as to form collector rods TC. These rods TC have one end communicating with the inside of the suction cylinder CA, as shown in FIG. 3. In this manner, the hydrocarbon HY is filtered by the screen TM so as to remove impurities such as sand SA prior to being sucked in through an orifice OC so as to be directed towards the inside of the suction cylinder CA. FIG. 3 shows such a collector rod TC which is connected to the inside of the suction cylinder, having one of its ends connected to the manifold CL. This rod thus communicates with the internal cavity CT of the manifold which in turn communicates with the inside of the cylinder CA via slots FE in the cylinder which are provided for this purpose. The other end of this rod (not shown) may be closed, for example. The lateral orifice OC made in the collector rod may, for example, be a drill hole as shown in FIG. 3 or it may be obtained by sawing away part of the rod, as shown in FIG. 4.

The screen TM of the rod of the invention may comprise a plurality of collector rods TC suitable for communicating with the inside of the cylinder CA via a manifold. The manifold may then include devices for shutting off or not shutting off the end of a rod. This makes it possible to increase the head loss introduced by the drain element by reducing the number of collector rods TC communicating with the inside of the suction cylinder, and to reduce this head loss by increasing the number of rods communicating with the inside of the suction cylinder. It is also possible to modify head loss by acting on the number of lateral orifices in the collector rods.

Such a manifold CL is substantially annular in shape as shown in FIGS. 6 and 7 so as to surround the cylinder CA and so as to be optionally suitable for mounting on the cylinder as an interference fit. It is in the form of a ring having a plurality of longitudinal holes PC in one of its faces that is normal to the longitudinal axis AL, which holes may be drill holes, and are designed to receive the rods of the screen TM so as to hold the screen on the suction cylinder CA. The manifold has an internal recess co-operating with the cylinder to define a toroidal cavity CT as can be seen in FIGS. 3 and 7. The toroidal cavity CT as provided in this way communicates with the inside of the suction cylinder CA via slots FE provided in the cylinder for this purpose, and placed in register with said toroidal cavity. The drill holes PC open out to the inside of this cavity to put the corresponding rods into communication with the cavity. The manifold thus serves to cause a plurality of hollow rods to communicate with the inside of the suction cylinder via the cavity CT. More particularly, the manifold also has tapped radial holes PC placed radially relative to the longitudinal axis AL and each communicating with a corresponding drill hole PC. Each radial hole P can itself be obtained by drilling and opens out to an outside surface of the manifold so as be accessible from the outside. With these radial drill holes PT, it is possible to shut off the end of the corresponding rod by inserting a long screw SL which reaches the bottom of the corresponding drill hole PC, or to avoid shutting off said end by inserting a short screw SS so as to leave the corresponding drill hole PC free.

With such a manifold, the head loss introduced by the drain element can be adjusted on site by selecting the number of collector rods that are in communication with the inside of the suction cylinder.

In the drain element of the invention, the head loss induced by a collector rod TC may be further increased by connecting said collector rod to the inside of the suction cylinder via a transport rod TT or a plurality of transport rods TT connected in series. The head loss that is induced is thus increased by lengthening the path along which the fluid must travel from the collector orifice OC in order to reach the inside of the cylinder CA. More particularly, the transport rods TT are hollow tubular rods of the screen suitable for being made out of the same material as the collector rods, but not necessarily presenting any collector orifices.

As can be seen in FIG. 5, the screen TM may comprise, for example, alternating collector rods TC and transport rods TT connected together in pairs. In such a configuration, a collector rod has one end closed, while its other end is connected to one end of a corresponding transport rod, and the transport rod has its second end left open for connection to the inside of the cylinder CA. Naturally, this configuration is given by way of non-limiting example and other configurations can be envisaged, for example alternating one collector rod TC with two transport rods TT in order to associate in similar manner a collector rod with two transport rods connected in series.

More particularly, the transport rods and the collector rods may be connected in series by means of a second manifold CL. Such a second manifold CL is similar in shape to that shown in FIGS. 6 and 7, but further comprises channels interconnecting successive drill holes PC, as shown in FIG. 8 so that two successive drill holes are interconnected by a channel CN instead of being connected to a toroidal cavity. In this manner, by placing a first manifold as shown in FIGS. 6 and 7 at one end of the drain element, and a second manifold as shown in FIG. 8 at the other end of the drain element, the rods are associated in the manner described with reference to FIG. 5.

As can be seen, in the drain element of the invention, it is the rods that constitute the screen which collect and transport hydrocarbon to the inside of the suction cylinder, and these rods may be associated in a wide variety of combinations in order to adjust the head loss introduced by the drain element as appropriately as possible.

What is claimed is:

1. A strainer having a filter screen constituted by a metal wire (FI) wound around and fixed to a tubular structure formed by rods which extend in a longitudinal direction (AL) between two rings, the rods being inserted at their two ends into the two rings and being regularly distributed around the periphery of the rings, the strainer being characterized in that one of the rings includes an internal cavity (CT), and in that one or more of the rods is or are hollow rods (TC) which include a lateral orifice (OC) and communicate at one end thereof with the internal cavity of the ring in such a manner that a fluid can penetrate from outside the strainer into the internal cavity of the ring, or vice versa.

2. A drain element for collecting hydrocarbons in particular, the element comprising a strainer according to claim 1, in which the filter screen of the strainer surrounds a suction cylinder (CA) on which the two rings (CL) are mounted to constitute a system for adjusting the head loss introduced by the drain element, the suction cylinder (CA)

communicating with said internal cavity (CT) of the ring in such a manner that hydrocarbon can be taken thereto at a controlled rate from outside the strainer towards the inside of the suction cylinder via the hollow rods of the filter screen.

3. A drain element according to claim 2, in which channels (CN) are formed inside the rings (CL) for connecting together the hollow rods with the option of modifying the head loss introduced by the drain element by means of screws which are mounted in the rings from the outside thereof in order to close off the channels (CN).

4. A drain element according to claim 3, in which the rods include other hollow rods without lateral orifices forming transport rods (TT), and in which the screws are mounted in such a manner as to connect the lateral orifice (OC) of a collector hollow rod (TC) to said internal cavity (CT) of the ring via one or more hollow transport rods (TT).

5. A drain element according to any one of claim 2, in which said internal cavity (CT) of the ring communicates with the inside of the suction cylinder (CA) via slots (FE) formed in the suction cylinder.

6. A drain element according to any one of claim 2, in which the rings (CL) are interference fitted on the suction tube (CA).

7. A drain element according to any one of claim 1, in which the lateral orifice (OC) of each hollow rod is made by drilling or sawing away part of the hollow rod.

* * * * *